(12) United States Patent
Yasuda et al.

(10) Patent No.: US 12,470,103 B2
(45) Date of Patent: Nov. 11, 2025

(54) SEMICONDUCTIVE MEMBER, STATOR COIL, AND ROTATING ELECTRIC MACHINE

(71) Applicant: Mitsubishi Electric Corporation, Tokyo (JP)

(72) Inventors: Takumi Yasuda, Tokyo (JP); Takahiro Mabuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 246 days.

(21) Appl. No.: 18/276,656

(22) PCT Filed: Mar. 23, 2021

(86) PCT No.: PCT/JP2021/011847
§ 371 (c)(1),
(2) Date: Aug. 10, 2023

(87) PCT Pub. No.: WO2022/201279
PCT Pub. Date: Sep. 29, 2022

(65) Prior Publication Data
US 2024/0128820 A1    Apr. 18, 2024

(51) Int. Cl.
*H02K 3/02* (2006.01)
*H02K 3/40* (2006.01)

(52) U.S. Cl.
CPC ..................... *H02K 3/02* (2013.01)

(58) Field of Classification Search
CPC .................. H02K 3/02; H02K 3/42
See application file for complete search history.

(56) References Cited

U.S. PATENT DOCUMENTS

| | | | |
|---|---|---|---|
| 2008/0106157 A1* | 5/2008 | Higashimura | H01B 1/24 310/214 |
| 2014/0028140 A1* | 1/2014 | Mabuchi | H02K 15/105 310/180 |

(Continued)

FOREIGN PATENT DOCUMENTS

| | | | |
|---|---|---|---|
| JP | 2006-109600 A | | 4/2006 |
| JP | 2006246599 A | * | 9/2006 |

(Continued)

OTHER PUBLICATIONS

JP-2006246599-A, all pages (Year: 2006).*

(Continued)

*Primary Examiner* — Naishadh N Desai
(74) *Attorney, Agent, or Firm* — XSENSUS LLP (57) ABSTRACT

Provided is a semiconductive tape in which semiconductive resin layers in which metal particles are dispersedly mixed are disposed on a fibrous insulation substrate, wherein the metal particles have a melting point higher than the curing temperature of the thermosetting resin to be subjected to an impregnation treatment and lower than the softening point of the fibrous insulation substrate. The semiconductive tape is used for the stator coil of a rotating electric machine to suppress erosion of the thermosetting resin, impairment of semiconductivity thereof, and the like caused by heat generation, discharges and the like during operation of the rotating electric machine, thus exhibiting corona resistance stably over an extended period of time.

20 Claims, 6 Drawing Sheets

(56) References Cited

U.S. PATENT DOCUMENTS

| | | | | |
|---|---|---|---|---|
| 2014/0327335 A1* | 11/2014 | Mabuchi | ................... | H01F 5/06 |
| | | | | 428/323 |
| 2015/0336335 A1* | 11/2015 | Okawa | ................... | B32B 5/024 |
| | | | | 264/510 |
| 2016/0374236 A1 | 12/2016 | Eder et al. | | |
| 2019/0149006 A1 | 5/2019 | Mura et al. | | |

FOREIGN PATENT DOCUMENTS

| | | |
|---|---|---|
| JP | 2007-306645 A | 11/2007 |
| JP | 2017-514293 A | 6/2017 |
| WO | 2018/002974 A1 | 1/2018 |
| WO | 2019/117055 A1 | 6/2019 |

OTHER PUBLICATIONS

International Search Report and Written Opinion mailed on Jun. 8, 2021, received for PCT Application PCT/JP2021/011847, filed on Mar. 23, 2021, 9 pages including English Translation.

\* cited by examiner

SEMICONDUCTIVE MEMBER, STATOR COIL, AND ROTATING ELECTRIC MACHINE

CROSS-REFERENCE TO RELATED APPLICATION

The present application is based on PCT filing PCT/JP2021/011847, filed Mar. 23, 2021, the entire contents of which are incorporated herein by reference.

TECHNICAL FIELD

The present application relates to a semiconductive member, a stator coil, and a rotating electric machine.

BACKGROUND ARTS

In a stator coil used for the stator of a high-power rotating electric machine or the like, in order to suppress corona discharges occurring in micro spaces between the core and the main insulation layer, a semiconductive layer is disposed that is a semiconductive tape wound around the outside of the main insulation layer shielding a conductor body formed of a bundle of wire conductors. The semiconductive tape plays a role in reducing voltages shared with micro spaces on the surface of the core by mitigating potential gradients between the core and the main insulation layer. The semiconductive tape is manufactured by disposing on a fibrous insulation substrate, such as a glass cloth or a nonwoven fabric, a semiconductive resin layer formed of a resin to which conductive particles, such as carbon black, are added.

In recent years, since rotating electric machines are liable to increase in electrical, thermal, and mechanical stress during operation as become further smaller in size and increasing in output power, the semiconductive layer is deteriorated over time. Moreover, since the semiconductive layer is difficult to manufacture with no interstices (voids) at all at the interface between the main insulation layer and the semiconductive layer, partial discharges occur emanating from the voids due to the correspondingly high potential gradients, so that the deterioration of the semiconductive layer is accelerated, thus making it difficult to suppress for a long time the corona discharges occurring in the spaces between the core and the main insulation layer.

Hence, a semiconductive tape has been disclosed that is formed of a semiconductive resin layer made by adding at least one kind of inorganic particles selected among layered clay mineral based particles, oxide based particles, and nitride based particles together with conductive particulates to a resin and of a fibrous insulation substrate coated with the semiconductive resin layer (see, for example, Patent Document 1). Furthermore, a semiconductive tape has been disclosed that is formed of an admixture made by adding nonconductive nanoparticles together with conductive particles to a high molecular weight polymer and of a fibrous insulation substrate on which the admixture is disposed (see, for example, Patent Document 2).

PRIOR ART DOCUMENT

Patent Documents

Patent Document 1: JP2006-246599A (Paragraph [0008] and FIG. 1)

Patent Document 2: WO2018/002974A (Paragraph [0050] and FIG. 4)

SUMMARY OF THE INVENTION

Problem that the Invention is to Solve

Deterioration effect due to the partial discharges is roughly classified into impact effect due to charged particles, thermal decomposition effect due to a local temperature increase, and chemical effect due to activated gases produced by the discharges, and the deterioration progresses by these synergistic effects. This time, we newly discovered a finding that the activated gases such as ozone ($O_3$) and atomic oxygen (O) produced by the discharges have a significant oxidation effect among these effects and are dominant factor in the deterioration of the semiconductive layer. Although in this regard, a semiconductive tape disclosed as in above Patent Documents can be expected to improve initial corona resistance and the like, the resin and the high molecular weight polymer, which are organic compounds, deteriorate fast into low molecular weight volatile products owing to oxidation effect of the ozone and the atomic oxygen produced by the above-mentioned partial discharges, thus posing a problem of difficulty in keeping the initial corona resistance for a long time.

The present application discloses a technology for resolving such above problems and aims at providing a semiconductive member, a stator coil, and a rotating electric machine that are able to stably exhibit corona resistance over an extended period of time.

Means for Solving the Problem

A semiconductive member disclosed in this application is a semiconductive member in which semiconductive resin layers in which metal particles are dispersedly mixed are disposed on a fibrous insulation substrate, said metal particles having a melting point higher than the curing temperature of the thermosetting resin and lower than the softening point of said fibrous insulating substrate.

A stator coil disclosed in the present application comprises a winding configured with a conductor body formed of a bundle of wire conductors; an insulation layer formed of a mica wound around an outer circumference of the conductor body; and a semiconductive layer formed of the above semiconductive member wound around an outer circumference of the insulation layer, wherein the winding is impregnated with the thermosetting resin.

A rotating electric machine disclosed in the present application comprises the above stator coil.

Advantageous Effect of the Invention

According to the present application, a semiconductive member, a stator coil, and a rotating electric machine can be provided that are able to stably exhibit the corona resistance over an extended period of time.

DETAILED DESCRIPTION OF THE INVENTION

Embodiment 1

Figure 1:
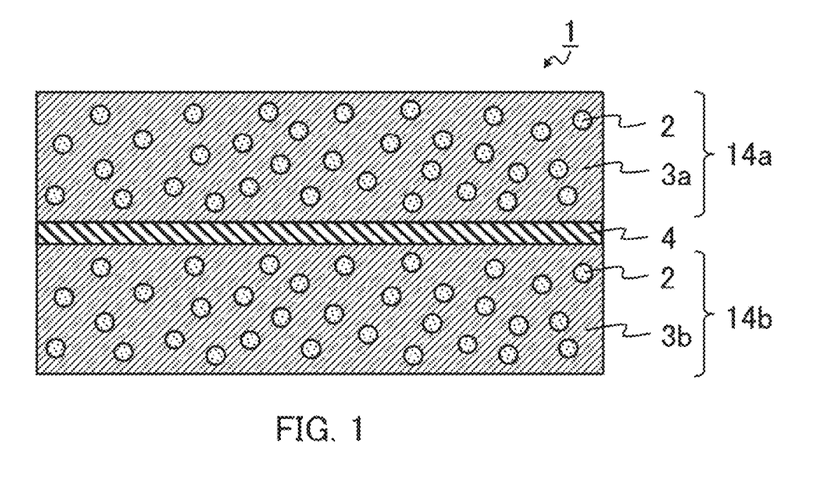
FIG. 1 is a schematic cross-sectional view showing a structure of a semiconductive tape according to Embodiment 1.

FIG. 1 is a schematic cross-sectional view showing a structure of a semiconductive tape 1 according to Embodiment 1 of the present application. As show in FIG. 1, the semiconductive tape 1 as a semiconductive member holds on both sides of a fibrous insulation substrate 4 respective semiconductive resin layers 14a, 14b formed of thermosetting resin 3a, 3b in which metal particles 2 as conductive particles are dispersedly mixed. The semiconductive tape 1 according to Embodiment 1 is characterized by using the metal particles 2 having a low melting point ranging from higher than the curing temperature of the thermosetting resin to be subjected to an impregnation treatment to lower than the softening point of the fibrous insulation substrate 4. With this character, occurrence of a local temperature rise caused by the partial discharges melts metal particles existing near voids to establish conductivity with ozone resistance along the inner surfaces of the voids, thus allowing for improving the corona resistance of the thermosetting resin.

Figure 2:
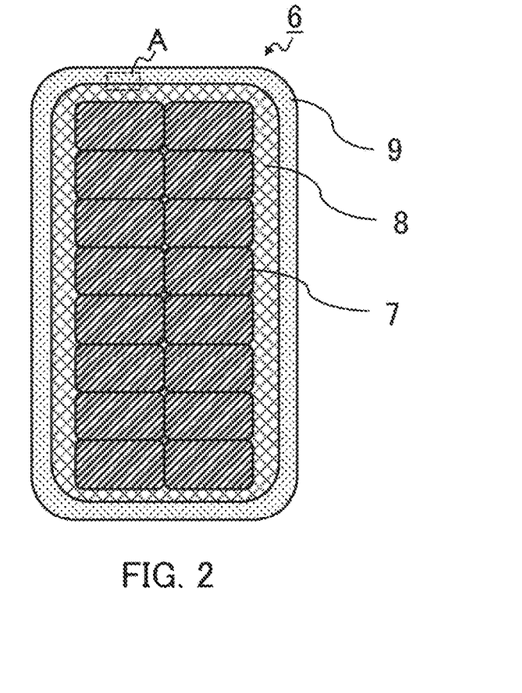
FIG. 2 is a schematic cross-sectional view showing a structure of a stator coil manufactured using the semiconductive tape according to Embodiment 1.

FIG. 2 is a schematic cross-sectional view showing a structure of a stator coil 6 that uses the semiconductive tape 1 according to Embodiment 1. As shown in FIG. 2, the stator coil 6 comprises a winding configured with a conductor body 7 formed of a bundle of wire conductors; a main insulation layer 8 formed of a mica tape wound around the outer circumference of the conductor body 7; and a semiconductive layer 9 formed of the semiconductive tape 1 wound around the outside of the main insulation layer 8, and is manufactured by performing a pressure impregnation treatment on the winding with the electrically insulating varnish and then performing a heat curing treatment thereon. The stator coil 6 shown in FIG. 2 is applied to a rotating electric machine such as a motor. Furthermore, application examples of the semiconductive tape 1 of the present application are not limited to only the semiconductive layer for the stator coil of the rotating electric machine or the like, but the semiconductive tape can be used for various applications such as a generator coil, a circuit breaker rod, and a cable sheath material.

Figure 3:
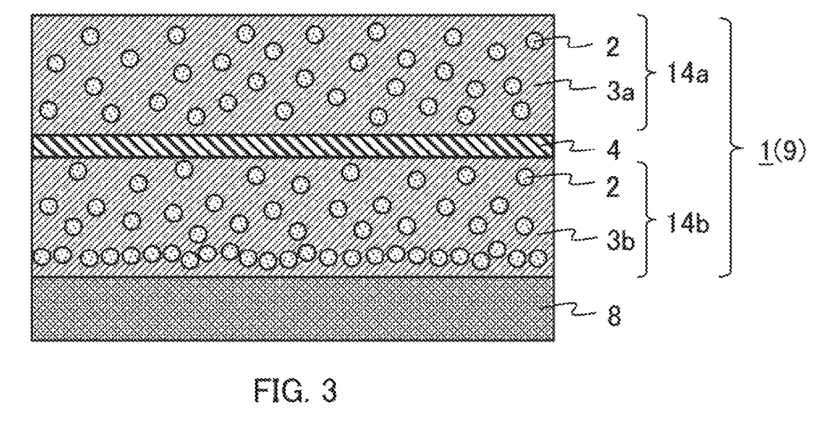
FIG. 3 is a schematic cross-sectional view showing another structure of the semiconductive tape according to Embodiment 1.

Note that in the semiconductive tape 1 according to Embodiment 1, the metal particles 2 are in a condition of being uniformly dispersed in the thermosetting resin 3, but the condition is not limited to this. FIG. 3 is a schematic cross-sectional view showing another structure of the semiconductive tape 1 according to Embodiment 1 of the present application and an enlarged view of the region A in FIG. 2. As shown in FIG. 3, in the another structure of the semiconductive tape 1, the metal particles 2 may be more dispersed locally toward the main insulation layer 8 in the thermosetting resin 3b of the semiconductive resin layer 14b. Since the semiconductive layer 9 formed of the semiconductive tape 1 is deteriorated by occurrence of the partial discharges emanating from the voids existing at the interface between the main insulation layer 8 and the semiconductive layer 9, the metal particles 2 are more dispersed toward the interface in the semiconductive resin layers 14b of the semiconductive tape 1 wound around and in contact with the main insulation layer 8. In this case, occurrence of the discharges inside the voids existing at the interface between the main insulation layer and the semiconductive layer melts the metal particles 2 and enables them to connect with neighboring particles, whereby conductivity is easily established with a higher ozone resistance, thus allowing for enhancing the corona resistance of the thermosetting resin.

Figure 4:
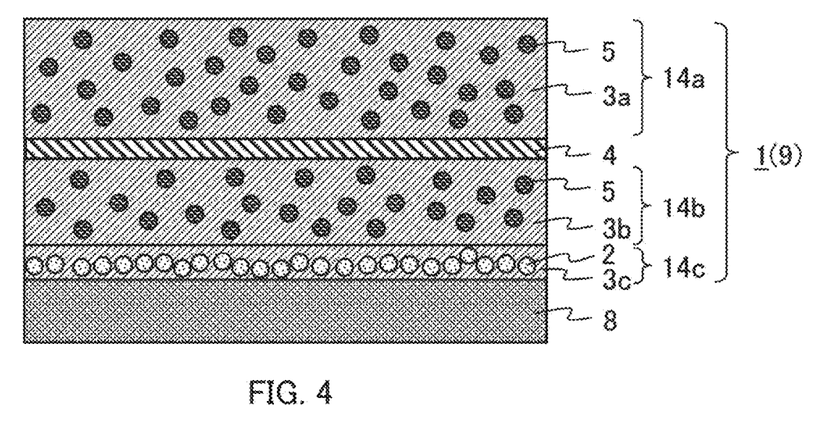
FIG. 4 is a schematic cross-sectional view showing still another structure of the semiconductive tape according to Embodiment 1.

FIG. 4 is a schematic cross-sectional view showing another structure of the semiconductive tape 1 according to Embodiment 1 of the present application and an enlarged view of the region A in FIG. 2. As shown in FIG. 4, in the still another structure of the semiconductive tape 1, a semiconductive resin layer may be used that is formed of a semiconductive resin layer 14c in which the metal particles 2 are dispersedly mixed in a thermosetting resin 3c and of the thermosetting resin layers 14a, 14b in which other conductive particles 5 are dispersedly mixed in the thermosetting resins 3a, 3b. Since the semiconductive layer 9 formed of the semiconductive tape 1 is deteriorated by occurrence of the partial discharges emanating from the voids existing at the interface between the main insulation layer 8 and the semiconductive layer 9, the metal particles 2 are more dispersed in the semiconductive resin layer 14c that is the other semiconductive resin layer on the interface side of the main insulation layer 8. Also in this case, occurrence of the discharges inside the voids existing at the interface between the main insulation layer and the semiconductive layer melts the metal particles 2 and enables them to connect with neighboring particles, whereby conductivity is easily established with a higher ozone resistance, thus allowing for enhancing the corona resistance of the thermosetting resin.

Any of the semiconductive tapes desirably have a surface resistance value ranging from 100Ω or more to 1000 kΩ or less. A surface resistance value less than 100Ω is not preferable because an eddy current is induced in the surface of the semiconductive layer during actual operation.

Each component constituting the semiconductor tape 1 according to Embodiment 1 is described in detail below.

<Metal Particles>

Low melting-point metal particles are used as the metal particles 2 having a melting point higher than the curing temperature of the thermosetting resin to be subjected to an impregnation treatment in the process of manufacturing the stator coil and lower than the softening point of the fibrous insulation substrate 4. This enables the metal particles 2 to melt due to a local temperature rise caused by partial discharges.

A low melting-point metal for the metal particles 2 includes, for example, multiple components containing Pb and Sn, multiple components containing Sn and Sb, multiple components containing Sn and Cu, multiple components containing Sn and Ag, or the like. These kinds of the metal particles 2 are characterized in that they melt by heating over 200° C. (having a melting point over 200° C.) that is higher than a curing temperature (100° C. to 190° C.) of a typical thermosetting resin to be subjected to an impregnation treatment in the process of manufacturing the stator coil.

A melting point is a temperature at which the phase of a metal is changed from the solid phase to the liquid phase when a metal is heated from a room temperature and can be estimated using a binary or a ternary alloy phase diagram of the metal, and the solidus line is thus defined as the melting point of the metal In a case of the metal particles 2 being composed of multiple components containing Pb and Sn, the composition more desirably contains Pb ranging from more than 0 mass % (inclusive of Sn alone) to less than 2.5 mass % or ranging from more than 75 mass % to less than 100 mass % (inclusive of Pb alone). In a case of Pb being more than 2.5 mass % and less than 75 mass %, since the melting point of the metal particles is below 200° C. even in a case of blending various additive elements, the metal particles 2 intrude as a foreign substance into the electrically insulating varnish in the impregnation treatment step, thus being not able to obtain desired electrical insulation characteristics of the stator coil 6.

In a case of the metal particles 2 being composed of multiple components containing Sn and Cu, the composition desirably contains Sn ranging from more than 25 mass % to less than 100 mass % (inclusive of Sn alone). In a case of the metal particles being composed of multiple components containing Sn and Ag, the composition desirably contains Sn ranging from more than 15 mass % to less than 100 mass % (inclusive of Sn alone). Since without the above-mentioned ranges, the melting point of the metal particles exceeds 700° C. even in a case of blending various additive elements, the melting is not brought about during the discharges, thus being not able to obtain the effect of improving a later-described desired corona resistance.

One kind alone of conductive particles or a mixture of two or more kinds thereof containing other conductive particles can be used for the metal particles 2. The kind of conductive particles is not particularly limited and can be appropriately used as long as it has conductivity. For example, used is conductive carbon material such as carbon black, graphite, conductive diamond, carbon fiber or carbon nanotube, or conductive metal oxide such as indium oxide, cadmium oxide, triiron tetraoxide, zinc oxide, tin oxide or titanium oxide, or a metal or the like.

The low-melting-point metal particles are used for the metal particles 2 that have a melting point ranging higher than the curing temperature of the thermosetting resin to be subjected to the impregnation treatment and lower than the softening temperature of the fibrous insulation substrate 4. Even in a case of dispersing in the thermosetting resin 3 the metal particles 2 having such a melting temperature range, occurrence of the partial discharges emanating from the voids oxidatively decomposes the thermosetting resin 3 into low-volatile products by the deteriorating effect of the partial discharges (oxidation effect of ozone and atomic oxygen). However, due to the local temperature rise caused by the partial discharges, the metal particles 2 existing in the vicinity of the voids melt and wet-spread along the inner surfaces of the voids, and the melts of neighboring metal particles 2 coalesce with each other, whereby the inner surfaces of the voids are covered with the metal particles. Hence, the molten metal particles covering the inner surfaces of the voids function as a protective layer, thus being able to suppress thermal decomposition of the thermosetting resin 3 surrounding the voids and to exhibit the corona resistance.

Even in a case of using, instead of the metal particles, for example the inorganic particles disclosed in Patent Document 1 having a corona resistance, improvement in the initial corona resistance can be expected due to a physical barrier effect. However, unless the inorganic particles concentrate to fully cover the front end of progress of the deterioration, it is difficult to keep the initial corona resistance for a long time because the resin and the high molecular weight polymer existing between the inorganic particles are decomposed by the oxidation effect of ozone. Moreover, since the inorganic particles having electrical insulation properties are added in the semiconductive resin layer, the initial resistance value of the semiconductive tape decreases.

However, use of the metal particles 2 that melt, deform, and coalesce with each other due to the local temperature rise caused by the partial discharges as described in the present application can improve the corona resistance of the thermosetting resin 3. For this reason, the corona resistance can be stably exhibited over an extended period of time, and the initial resistance value of the semiconductive tape 1 can be kept.

The average particle size in the median diameter (D50: 50% diameter) of the metal particles 2 is desirably larger than 1 nm and smaller than 10 μm, more desirably larger than 10 nm and smaller than 1 μm. An average particle size measuring method when determining the above size range includes using, for example, a laser diffraction scattering particle size distribution analyzer (Microtrac® MT3300) or the like. Note that using the metal particles 2 having an average size smaller than 1 nm decreases the volume of particles melting when the temperature is locally raised by the partial discharges, thus being not able to exhibit the desired ozone resistance mentioned above. On the other hand, using the metal particles 2 having an average size larger than 10 prn increases the interparticle distances in proportion to the particle sizes and makes it difficult for neighboring particles to connect with each other when heat is generated by the discharges, thus being not able to exhibit the desired corona resistance mentioned above.

The metal particles 2 dispersedly exist in the thermosetting resin 3, and the mixing amount of the metal particles 2 on this occasion desirably ranges from 1 vol % to 50 vol % with respect to the thermosetting resin 3. If the mixing amount of the metal particles 2 is less than 1 vol % with respect to the thermosetting resin 3, the desired corona resistance cannot be exhibited. If the mixing amount of the metal particles 2 exceeds 50 vol % with respect to the thermosetting resin 3, on the other hand, the viscosity of the thermosetting resin 3 increases, whereby the metal particles 2 are difficult to disperse uniformly and the thermosetting resin 3 becomes brittle, thus making it also difficult to use the semiconductive layer as the tape.

Note that, in order for the partial discharges to occur emanating from the voids existing at the interfaces between the main insulation layer 8 and the semiconductive layer 9, it is desirable that the metal particles 2 are more dispersed locally near the one surface of the semiconductive tape 1 and the average interdistance between particles 2 is less than 1 m. If the average interparticle distance between the metal particles 2 exceeds 1 μm, neighboring particles are difficult to connect with each other when heat is generated by the discharges, thus being not able to exhibit the desired corona resistance.

The metal particles 2 may be used with the surfaces thereof being modified by or coated with a coupling agent or a surface treatment agent for the purpose of improving adhesion to the thermosetting resin 3, improving dispersibility in the thermosetting resin 3, or the like. Such a coupling agent includes, for example, a silane coupling agent such as γ-glycidoxypropyltrimethoxysilane, γ-aminopropyltrimethoxysilane, vinyltriethoxysilane, 3-methacryloxypropyltrimethoxysilane, and 3-glycidoxypropyltrimethoxysilane, and a titanate based coupling agent, an aluminium based coupling agent, and the like. The surface treatment agent includes aluminum laurate, aluminum stearate, iron stearate alumina, silica, zirconia, silicone, and the like. These coupling agents or surface treatment agents can be used alone or as a mixture of two or more kinds thereof.

<Thermosetting Resin>

The type of thermosetting resin 3 is not particularly limited and can be used appropriately as long as it has pliability after applied to the fibrous insulation substrate 4. The thermosetting resin 3 having such a property includes, for example, phenol resin, imide resin, alkyd resin, unsaturated polyester resin, polyester imide resin, epoxy resin, and the like.

<Fibrous Insulation Substrate>

The type of fibrous insulation substrate 4 is not particularly limited and can be used appropriately as long as it has an insulation property and the thermosetting resin can be applied thereto. The fibrous insulation substrate 4 having such a property includes, for example, glass cloth (softening point: 950° C.), polyester cloth (softening point: 240° C.), tetron cloth (softening point: 260° C.), mica sheet (softening point: 750° C.), and the like.

In addition to the above-mentioned components, additives may be blended as necessary in the constituent material of the semiconductive tape 1 of Embodiment 1 in a range without impairing the advantageous effect of the present application. Other additives to be blended in the material of the semiconductive tape 1 includes a reactive diluent, a viscosity modifier such as toluene and xylene, a curing accelerator, an anti-dripping agent, an anti-settling agent, a defoaming agent, a leveling agent, a slip agent, a dispersing agent, and a substrate wetting agent.

Figure 5:
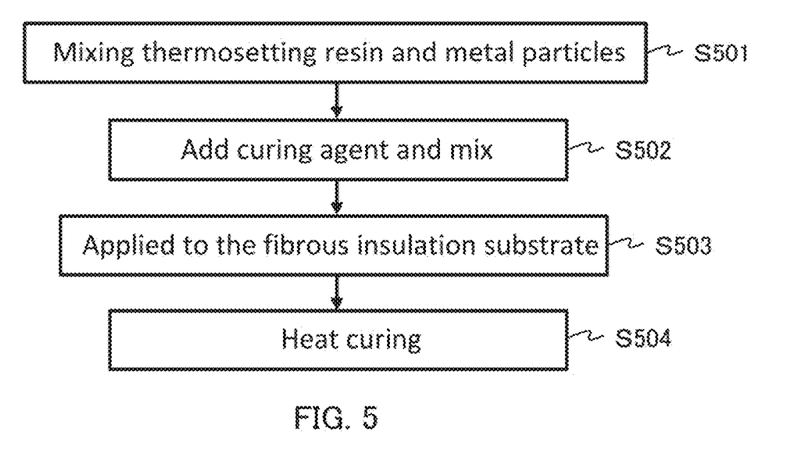
FIG. 5 is a flowchart showing a process of manufacturing the semiconductive tape according to Embodiment 1.

Next, a method of manufacturing the semiconductive tape 1 according to Embodiment 1 is described with reference to FIG. 5. FIG. 5 is a flowchart showing a manufacturing process in the method of manufacturing the semiconductive tape 1 according to Embodiment 1.

First, the thermosetting resin 3 and the metal particles 2 are mixed and kneaded (Step S501). Shear mixing performed by applying a shear force is desirably applied to the step of mixing and kneading the metal particles 2 into the thermosetting resin 3. By applying the shear force, the metal particles 2 can be uniformly dispersed in the thermosetting resin 3.

The type of mixing apparatus using shear mixing is not particularly limited and can be appropriately used as long as it is able to perform mixing while applying a shear force. Specific examples of the mixing apparatus include a bead mill mixer, a triple roll mill mixer, a homogenizer mixer, a Labo Plastmill mixer, and the like.

Subsequently, a curing agent is added to and then mixed into the mixture of the thermosetting resin 3 and the metal particles 2 (Step S502). After mixing, the mixture containing the curing agent is applied to the fibrous insulation substrate 4 (Step S503) and thermally cured (Step S504). In this way, the target semiconductive tape 1 can be obtained.

Note that in the manufacturing process for the semiconductive tape 1, the coupling agent or the surface treatment agent is appropriately added and mixed as necessary. By modifying the surfaces of the metal particles 2 with the coupling agent or the surface treatment agent, the thermosetting resin 3 and the metal particles 2 can be brought into firm contact with each other at their interfaces. Moreover, in a case of using the metal particles 2 having the multiple components containing Pb and Sn, an affinity for the epoxy resin is imparted by the organic compound intervening at the interface between the particles and the resin, thus being able to disperse the metal particles 2 uniformly in the thermosetting resin 3.

As described above, the semiconductive tape 1 according to Embodiment 1 has semiconductive resin layers 14a, 14b dispersed and mixed with metal particles 2 disposed on the fibrous insulation substrate 4, and the metal particles 2 have a melting point that is higher than the curing temperature of the thermosetting resin to be treated with impregnation and lower than the softening point of the fibrous insulation substrate 4. Moreover, the stator coil 6 according to Embodiment 1 comprises a winding configured with a conductor body 7 formed of a bundle of wire conductors, the main insulation layer 8 formed of a mica tape wound around an outer circumference of the conductor body 7 and the semiconductive layer 9 formed of the above semiconductive tape 1 wound around an outer circumference of the main insulation layer 8, wherein the winding is impregnated with the thermosetting resin. Furthermore, the rotating electric machine according to Embodiment 1 is provided with the above stator coil. Hence, it is possible to suppress erosion of the thermosetting resin and impairment of semiconductivity thereof caused by the effects of the heat generation, the discharges, and the like during operation of the rotating electric machine. Moreover, corona discharges occurring in micro spaces between the core and the main insulation layer can be effectively suppressed for a long time, thus being able to provide the semiconductive tape, the stator coil, and the rotating electric machine that exhibit a high reliability over an extended. In other words, since the metal particles bring about resistance to the activated gases such as ozone and atomic oxygen generated by partial discharge inside voids whereby the deterioration of thermosetting resin with time is suppressed, thus stably exhibiting the corona resistance over an extended period of time.

EXAMPLES

The details of the present application are described below using Implementation Examples and Comparative Examples. However, the present application is not limited by these Examples.

Implementation Example 1

The semiconductive tape 1 is manufactured as follows: Pb—Sn based metal particles (Pb2.5-Sn97.5 made by Mitsui Mining & Smelting Co., Ltd.) having a melting point of 200° C. are mixed into an epoxy resin (bisphenol A-type epoxy resin made by Mitsubishi Chemical Corp.) while applying a shear force using a mixer (ultrasonic homogenizer made by Japan Alex Corp.); a curing agent (modified alicyclic amine made by Mitsubishi Chemical Corp.) that imparts pliability after curing is added to and mixed in the mixture; and after that, the added and mixed mixture is applied to a glass cloth that is the fibrous insulation substrate, and is heat-dried.

Implementation Example 2

The semiconductive tape 1 is manufactured as follows: Pb—Sn based metal particles (Pb95-Sn5 made by Mitsui Mining & Smelting Co., Ltd.) having a melting point of 300° C. are mixed into the epoxy resin (bisphenol A-type epoxy resin made by Mitsubishi Chemical Corp.) while applying a shear force using the mixer (ultrasonic homogenizer made by Japan Alex Corp.); the curing agent (modified alicyclic amine made by Mitsubishi Chemical Corp.) that imparts pliability after curing is added to and mixed in the mixture: and after that, the added and mixed mixture is applied to the glass cloth that is the fibrous insulation substrate, and is heat-dried.

Implementation Example 3

The semiconductive tape 1 is manufactured as follows: Sn—Cu based metal particles (Sn 40-Cu60 made by Mitsui Mining & Smelting Co., Ltd.) having a melting point of 600° C. are mixed into the epoxy resin (bisphenol A-type epoxy resin made by Mitsubishi Chemical Corp.) while applying a shear force using the mixer (ultrasonic homogenizer made by Japan Alex Corp.); the curing agent (modified alicyclic amine made by Mitsubishi Chemical Corp.) that imparts pliability after curing is added to and mixed in the mixture; and after that, the added and mixed mixture is applied to the glass cloth that is the fibrous insulation substrate, and is heat-dried.

Implementation Example 4

The semiconductive tape 1 is manufactured as follows: Sn—Cu based metal particles (Sn25-Cu75 made by Mitsui Mining & Smelting Co., Ltd.) having a melting point of 700° C. are mixed into the epoxy resin (bisphenol A-type epoxy resin made by Mitsubishi Chemical Corp.) while applying a shear force using the mixer (ultrasonic homogenizer made by Japan Alex Corp.); the curing agent (modified alicyclic amine made by Mitsubishi Chemical Corp.) that imparts pliability after curing is added to and mixed in the mixture; and after that, the added and mixed mixture is applied to the glass cloth that is the fibrous insulation substrate, and is heat-dried.

Implementation Example 5

The semiconductive tape 1 is manufactured as follows: the Pb—Sn based metal particles (Pb2.5-Sn97.5 made by Mitsui Mining & Smelting Co., Ltd.) having the melting point of 200° C. are mixed into a silicone resin (made by Shin-Etsu Chemical Co., Ltd) while applying a shear force using the mixer (ultrasonic homogenizer made by Japan Alex Corp.); and after that, the mixture is applied to the glass cloth that is the fibrous insulation substrate, and is heat-dried.

Implementation Example 6

The semiconductive tape 1 is manufactured as follows: the Pb—Sn based metal particles (Pb2.5-Sn97.5 made by Mitsui Mining & Smelting Co., Ltd.) having the melting point of 200° C. are mixed into an unsaturated polyester resin (made by Showa Denko Co., Ltd.) while applying a shear force using the mixer (ultrasonic homogenizer made by Japan Alex Corp.); and after that, the mixture is applied to the glass cloth that is the fibrous insulation substrate, and is heat-dried.

Implementation Example 7

The semiconductive tape 1 is manufactured as follows: the Pb—Sn based metal particles (Pb2.5-Sn97.5 made by Mitsui Mining & Smelting Co., Ltd.) having the melting point of 200° C. are mixed into the epoxy resin (bisphenol A-type epoxy resin made by Mitsubishi Chemical Corp.) while applying a shear force using the mixer (ultrasonic homogenizer made by Japan Alex Corp.); the curing agent (modified alicyclic amine made by Mitsubishi Chemical Corp.) that imparts pliability after curing is added to and mixed in the mixture; and after that, the added and mixed mixture is applied to a polyester cloth that is the fibrous insulation substrate, and is heat-dried.

Comparative Example 1

The semiconductive tape is manufactured as follows: Carbon black (made by Denka Co. Ltd) are mixed as the conductive particles into the epoxy resin (bisphenol A-type epoxy resin made by Mitsubishi Chemical Corp.) while applying a shear force using the mixer (ultrasonic homogenizer made by Japan Alex Corp.); the curing agent (modified alicyclic amine made by Mitsubishi Chemical Corp.) that imparts pliability after curing is added to and mixed in the mixture; and after that, the added and mixed mixture is applied to the glass cloth that is the fibrous insulation substrate, and is heat-dried.

Comparative Example 2

The semiconductive tape is manufactured as follows: Pb—Sn based metal particles (Pb5-Sn95 made by Mitsui Mining & Smelting Co., Ltd.) having a melting point of 190° C. are mixed into the epoxy resin (bisphenol A-type epoxy resin made by Mitsubishi Chemical Corp.) while applying a shear force using the mixer (ultrasonic homogenizer made by Japan Alex Corp.); the curing agent (modified alicyclic amine made by Mitsubishi Chemical Corp.) that imparts pliability after curing is added to and mixed in the mixture; and after that, the added and mixed mixture is applied to the glass cloth that is the fibrous insulation substrate, and is heat-dried.

Comparative Example 3

The semiconductive tape is manufactured as follows: Sn—Cu based metal particles (Sn20-Cu8 made by Mitsui Mining & Smelting Co., Ltd.) having a melting point of 710° C. are mixed into the epoxy resin (bisphenol A-type epoxy resin made by Mitsubishi Chemical Corp.) while applying a shear force using the mixer (ultrasonic homogenizer made by Japan Alex Corp.); the curing agent (modified alicyclic amine made by Mitsubishi Chemical Corp.) that imparts pliability after curing is added to and mixed in the mixture; and after that, the added and mixed mixture is applied to the glass cloth that is the fibrous insulation substrate, and is heat-dried.

Here, the compositions used in the semiconductive tapes of the implementation examples 1 to 7 and the comparative examples 1 to 3 are listed in Table 1.

TABLE 1

|  | conductive particles | | thermosetting resin | fibrous insulation substrate |
|---|---|---|---|---|
|  | type [at %] | melting point [° C.] | | |
| Implementation Example 1 | Pb2.5—Sn97.5 | 200 | epoxy resin | glass cloth |
| Implementation Example 2 | Pb95—Sn5 | 300 | epoxy resin | glass cloth |
| Implementation Example 3 | Sn40—Cu60 | 600 | epoxy resin | glass cloth |
| Implementation Example 4 | Sn25—Cu75 | 700 | epoxy resin | glass cloth |
| Implementation Example 5 | Pb2.5—Sn97.5 | 200 | silicone resin | glass cloth |
| Implementation Example 6 | Pb2.5—Sn97.5 | 200 | unsaturated polyester resin | glass cloth |
| Implementation Example 7 | Pb2.5—Sn97.5 | 200 | epoxy resin | polyester cloth |
| Comparative Example 1 | carbon black | 3500 | epoxy resin | glass cloth |
| Comparative Example 2 | Pb5—Sn95 | 190 | epoxy resin | glass cloth |
| Comparative Example 3 | Sn20—Cu80 | 710 | epoxy resin | glass cloth |

Figure 6:
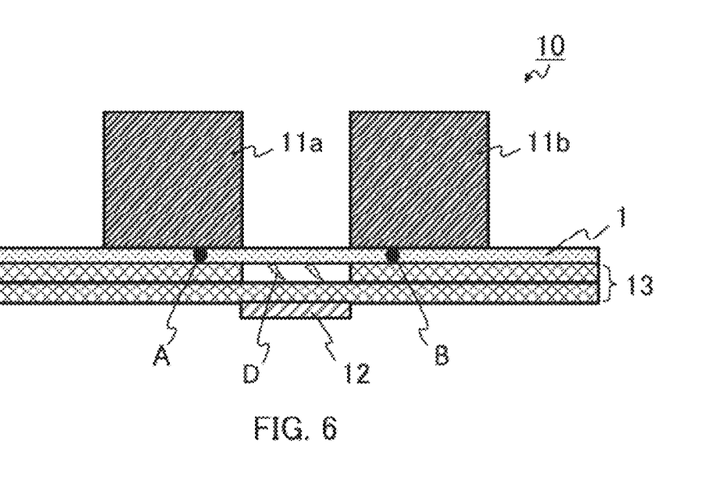
FIG. 6 is a schematic cross-sectional view showing a configuration of an evaluation device for the semiconductive tape according to Embodiment 1.

A Discharge test is performed on each semiconductive tape 1 of Implementation Examples 1 to 7 using an evaluation device 10 shown in FIG. 6 to evaluate the corona resistance. Each semiconductive tape 1 is placed between ground electrodes 11a and 11b of the evaluation device 10 to measure the surface resistance value between A and B before starting discharges. Next, an electrode 12 is fixed via an insulator 13 with a gap of 1 mm from the surface of the semiconductive tape 1. A voltage of 5.0 kV is applied between the electrode 12 and the ground electrodes 11a, 11b to generate partial discharges D in the gap between the semiconductive tape 1 and the electrode 12. And then, the surface resistance value between A and B is measured after a lapse of 200 hours from the start of the discharges. The discharge test is also performed on each semiconductive tape of Comparative Examples 1 to 3 in the same procedure to measure the surface resistance value between A and B.

The surface resistance values between A and B before and after the discharge test performed on the semiconductive tapes of Implementation Examples 1 to 7 and Comparative Examples 1 to 3 are listed in Table 2.

TABLE 2

|  | surface resistance value [Ω] between A-B | |
|---|---|---|
|  | before discharge test | after discharge test |
| Implementation Example 1 | 380 | 2000 |
| Implementation Example 2 | 340 | 2400 |
| Implementation Example 3 | 280 | 3200 |
| Implementation Example 4 | 420 | 6400 |
| Implementation Example 5 | 340 | 2200 |
| Implementation Example 6 | 400 | 3200 |
| Implementation Example 7 | 450 | 4400 |
| Comparative Example 1 | 420 | 60000 |
| Comparative Example 2 | 90 | — |
| Comparative Example 3 | 380 | 60000 |

As shown by the surface resistance values after the discharge tests listed in Table 2, the semiconductive tapes 1 of Implementation Examples 1 to 7 suppress increase in the surface resistance values caused by the partial discharges compared with those of Comparative Examples 1, 3. Note that in the semiconductive tape of Comparative Example 2, the metal particles melt and connect with each other in the heat-drying step, and the surface resistance value between A and B falls below the appropriate range. A low surface resistance value of the semiconductive tape is not preferable because an eddy current might be induced in the semiconductive layer during actual operation.

A comparison is made between Implementation Example 1 and Comparative Example 1. In the semiconductive tape 1 of the implementation example 1, the metal particles having the melting point of 200° C. are dispersed in the epoxy resin. In Comparative Example 1, on the other hand, carbon black is dispersed in the epoxy resin as the conductive particles instead of the metal particles. As shown by the surface resistance values after discharge listed in Table 2, in Implementation Example 1, the metal particles dispersed in the epoxy resin melt due to a local temperature rise caused by the partial discharges, whereby the corona resistance is brought about and erosion of the epoxy resin is suppressed. Accordingly, increase in the surface resistance value is kept low. In Comparative Example 1, however, since the carbon black and the thermosetting resin are eroded by the oxidation effect of ozone produced by the discharges, the surface resistance value increases, thus losing the properties of the semiconductive tape.

A comparison is made between Implementation Example 1 and Comparative Example 2. The semiconductive tape of Implementation Example 1 suppresses increase in the surface resistance value to a low level by dispersing the Pb2.5-Sn97.5 metal particles having the melting point of 200° C. into the thermosetting epoxy resin. This is because the metal particles dispersed in the epoxy resin melt due to the local temperature rise caused by the partial discharges whereby the corona resistance is brought about and erosion of the epoxy resin is suppressed. In comparative Example 2, however, since the melting point of the Pb5-Sn95 metal particles is 190° C. and within the range of the heat drying temperature (100° C. to 190° C.) in the manufacturing process for the semiconductive tape, the metal particles melt and connect with each other and the surface resistance value is below the appropriate range. Since an eddy current might be induced in the semiconductive layer during actual operation, desired electrical characteristics of the stator coil cannot be obtained. Moreover, since the melting point is within the range of the curing temperature (100° C. to 190° C.) of a typical thermosetting resin to be subjected to the impregnation treatment in the manufacturing process of the stator coil, the metal particles intrude as a foreign substance into the electrically insulating varnish in the impregnation treatment step, thus being not able to obtain desired electrical insulation characteristics of the stator coil.

A comparison is made between Implementation Example 4 and Comparative Example 3, In either semiconductive tapes of Implementation Example 4 and Comparative Example 3, the Sn—Cu based metal particles are dispersed in the thermosetting epoxy resin. While increase in the surface resistance value of Implementation Example 4 is suppressed to a low level, the surface resistance value of Comparative Example 3 largely increases. In Implementation Example 4, since the Sn25-Cu75 metal particles having the melting point of 700° C. are dispersed in the epoxy resin and the metal particles melt due to the local temperature rise caused by the partial discharge whereby the corona resistance is brought about and erosion of the epoxy resin is suppressed, increase in the surface resistance value is kept low. In Comparative Example 3, however, since the corona resistance is not brought about because the Sn20-Cu80 metal particles having the melting point of 710° C. do not melt due to the temperature rise caused by the partial discharges, and since the thermosetting resin is eroded by the oxidation effect of ozone produced by the discharges, the surface resistance value increases, thus losing the properties of the semiconductive tape.

Although the present application describes an exemplary embodiment and various examples, it should be understood that various features and aspects and functionalities described in the embodiment are not limited to their applicability to the particular embodiment but instead can be applied alone or in various combinations to one or more of the embodiments. Therefore, numerous modifications that have not been exemplified are conceivable without departing from the technical scope disclosed in the specification of the present application. For example, at least one of the constituent components may be modified, added, or eliminated, and further at least one of the constituent components mentioned in at least one of the preferred embodiments may be selected and combined with the other constituent elements.

REFERENCE NUMERALS

1: semiconductive tape (semiconductive member);
2: metal particles;
4: fibrous insulation substrate, and
14a, 14b, 14c: semiconductive resin layer.

The invention claimed is:

1. A semiconductive member in which semiconductive resin layers in which metal particles are dispersedly mixed are disposed on a fibrous insulation substrate,
said metal particles having a melting point higher than 200° C. that is a curing temperature of the thermosetting resin and lower than 700° C. that is a softening point of said fibrous insulating substrate, and are made of multiple components containing Pb and Sn, multiple components containing Sn and Sb, multiple components containing Sn and Cu, or multiple components containing Sn and Ag.

2. The semiconductor member of claim 1, wherein the mixing amount of the metal particles ranges from 1 vol % to 50 vol % with respect to a resin portion of the semiconductive resin layer.

3. The semiconductor member of claim 1, wherein the metal particles have an average size ranging from 1 nm to 10 μm.

4. The semiconductor member of claim 1, wherein a coupling agent or a surface treatment agent intervenes at the interfaces between a resin portion of the semiconductive resin layer and the metal particles.

5. A stator coil comprising:
a winding configured with
a conductor body formed of a bundle of wire conductors;
an insulation layer formed of a mica wound around an outer circumference of the conductor body; and
a semiconductive layer formed of the semiconductive member of claim 1 wound around an outer circumference of the insulation layer,
wherein the winding is impregnated with the thermosetting resin.

6. The stator coil of claim 5, wherein in the semiconductive layer, the metal particles are more dispersed toward an interface between the insulation layer and the semiconductive member in contact with the insulation layer.

7. The stator coil of claim 6, wherein in the semiconductive layer, conductive particles are used instead of the metal particles except for the more dispersed metal particles.

8. A rotating electric machine comprising the stator coil of claim 5.

9. The semiconductor member of claim 2, wherein the metal particles have an average size ranging from 1 nm to 10 μm.

10. The semiconductor member of claim 2, wherein a coupling agent or a surface treatment agent intervenes at the interfaces between a resin portion of the semiconductive resin layer and the metal particles.

11. The semiconductor member of claim 3, wherein a coupling agent or a surface treatment agent intervenes at the interfaces between a resin portion of the semiconductive resin layer and the metal particles.

12. The semiconductor member of claim 9, wherein a coupling agent or a surface treatment agent intervenes at the interfaces between a resin portion of the semiconductive resin layer and the metal particles.

13. A stator coil comprising:
a winding configured with
a conductor body formed of a bundle of wire conductors;
an insulation layer formed of a mica wound around an outer circumference of the conductor body; and
a semiconductive layer formed of the semiconductive member of claim 4 wound around an outer circumference of the insulation layer,
wherein the winding is impregnated with the thermosetting resin.

14. A stator coil comprising:
a winding configured with
a conductor body formed of a bundle of wire conductors;
an insulation layer formed of a mica wound around an outer circumference of the conductor body; and
a semiconductive layer formed of the semiconductive member of claim 5 wound around an outer circumference of the insulation layer,
wherein the winding is impregnated with the thermosetting resin.

15. The stator coil of claim 13, wherein in the semiconductive layer, the metal particles are more dispersed toward an interface between the insulation layer and the semiconductive member in contact with the insulation layer.

16. The stator coil of claim 15, wherein in the semiconductive layer, the metal particles are more dispersed toward an interface between the insulation layer and the semiconductive member in contact with the insulation layer.

17. The stator coil of claim 15, wherein in the semiconductive layer, conductive particles are used instead of the metal particles except for the more dispersed metal particles.

18. The stator coil of claim 16, wherein in the semiconductive layer, conductive particles are used instead of the metal particles except for the more dispersed metal particles.

19. A rotating electric machine comprising the stator coil of claim 15.

20. A rotating electric machine comprising the stator coil of claim 17.

\* \* \* \* \*